United States Patent [19]

Ueda et al.

[11] Patent Number: 4,772,664
[45] Date of Patent: Sep. 20, 1988

[54] THERMOPLASTIC RESIN COMPOSITION

[75] Inventors: Sumio Ueda, Sodegaura; Hiroshi Harada, Kawasaki; Kazuo Yoshida; Koji Kasai, both of Yokohama, all of Japan

[73] Assignee: Asahi Kasei Kogyo Kabushiki Kaisha, Osaka, Japan

[21] Appl. No.: 945,692

[22] Filed: Dec. 23, 1986

[30] Foreign Application Priority Data

Dec. 26, 1985 [JP] Japan .................................. 60-295541
Nov. 7, 1986 [JP] Japan .................................. 61-265113

[51] Int. Cl.$^4$ .............................................. C08L 53/00
[52] U.S. Cl. ...................................... 525/92; 524/186; 525/397; 525/905
[58] Field of Search .......................................... 525/92

[56] References Cited

U.S. PATENT DOCUMENTS 4,315,086  2/1982  Ueno et al. .
4,339,376  7/1982  Kasahara et al. .
4,600,741  7/1986  Aycock et al. ........................ 525/92

FOREIGN PATENT DOCUMENTS 56-49753  5/1981  Japan .

Primary Examiner—Jacob Ziegler
Attorney, Agent, or Firm—Birch, Stewart, Kolasch & Birch

[57] ABSTRACT

A thermoplastic resin composition substantially constituted of (A) 25 to 70% by weight of a polyamide, (B) 25 to 70% by weight of a polyphenylene ether and (C) 2 to 25% by weight of a block copolymer having at least one polymer block mainly comprised of a vinyl aromatic compound and at least one polymer block mainly comprised of a conjugated diene compound having the content of the vinyl aromatic compound in the range of 25 to 85% by weight; wherein the polyamide forms a continuous phase, and, in the continuous phase, the polyphenylene ether is dispersed to form a dispersed phase having an average particle diameter ranging from 0.5 to 10 μm, and further, substantially all of the block copolymer is micro-dispersed in the dispersed phase of the polyphenylene ether. The composition is widely used as outerplate materials or wheel caps of automobiles, as electrical or electronical parts, especially the various connectors which are used in automobiles, etc.

17 Claims, No Drawings

THERMOPLASTIC RESIN COMPOSITION

TECHNICAL FIELD

The present invention relates to an improvement of a thermoplastic resin composition mainly constituted of components comprising polyamide, polyphenylene ether and a rubber-like substance. More specifically, it relates to a thermoplastic resin composition in which the above three components constitute a blend system in a specified dispersion form, and having an excellent balance in heat distortion resistance, impact resistance, oil resistance, stiffness, molding flow properties and so on.

BACKGROUND ART

Polyamide resins have excellent mechanical strength, oil resistance, abrasion resistance, thermal resistance, etc. and have hitherto been utilized in great quantities, due to the polyamide resins being one of the most typical of the engineering type plastics. However, polyamides have disadvantages in that polyamides have certain properties which are poor as compared with other plastics, such as properties related to dimensional stability, moisture absorption, heat distortion resistance under high load, and impact resistance in a dry state.

In contrast thereto, polyphenylene ether resins are resins having excellent dimensional stability, electrical properties, heat distortion resistance under high load, water resistance, etc., and have been widely used industrially in the form of a blend with polystyrene resins. Polyphenylene ether resins, however, have serious disadvantages in that these resins have poor oil resistance and molding flow properties.

Thus, attempts have been made to blend these two resins for the purpose of combining the advantages respectively inherent in each of these resins and minimize or eliminate the disadvantages characterized in the resins individually. Heretofore, a great number of such resin combinations have been proposed. Such resin combinations include those obtained by simply blending the polyamide and polyphenylene ether resins, in particular, by melt blending these resins (as disclosed in U.S. Pat. No. 3,379,792 and U.S. Pat. No. 4,338,421). However, polyphenylene ethers and polyamides are hardly compatible when blended, and as a result, it is impossible to obtain from such a simple blend a molded product which would have excellent mechanical strength.

Also known is a composition obtained by compounding as a compatibility-improving agent, said agent comprises a copolymer of a styrene compound with an α,β-unsaturated dicarboxylic acid anhydride, together with polyphenylene ether and polyamide, and further adding a rubber-like substance as an impact resistance-reinforcing agent (as disclosed in U.S. Pat. No. 4,339,376). Although in this composition the mechanical performance or oil resistance can be enhanced by virtue of improving the compatibility of the polyamide resin and the polyphenylene ether resin with each other, the attachment (presumably by graft polymerization) between these two resins through the compatibility-improving agent, would become excessive and render the dispersion between the two resins so extremely fine such a composition may be accompanied with disadvantages, such as the molding flow properties may be extremely lowered and the heat distortion resistance under high load may not be capable of being sufficiently enhanced.

There have been further proposed a process for producing a modified polymer which comprises adding to a polyamide and a polyphenylene ether, a compound having (a) a carbon-carbon double bond or a carbon-carbon triple bond and (b) a functional group such as a carboxyl group and an acid anhydride group in the molecule thereof, followed by melt kneading (as disclosed in U.S. Pat. No. 4,315,086), and a composition to which a rubber-like substance is further added (as disclosed in Japanese Unexamined Patent Publication No. 49753/1981). In these proposals, however, there are disadvantages in that sufficient impact resistance cannot be achieved and in that the molding flow properties obtained are inferior.

In other words, up to the present time, no conventional prior art process has been discovered for obtaining a resin composition which is excellent and well balanced in each of the impact resistance, heat distortion resistance, stiffness and molding flow properties.

Under such circumstances, it is an object of the present invention to provide a thermoplastic resin composition excellently balanced in heat distortion resistance, impact resistance, oil resistance, stiffness, molding flow properties, etc. in a blend system which comprises polyamide and polyphenylene ether.

The present inventors have made intensive studies to achieve the above purpose and as a result, found that the purpose can be achieved by controlling in a particular state, the dispersion form of the three components in a composition which comprises in a specified proportion a polyamide, a polyphenylene ether and, as a reinforcing agent, a rubber-like substance having a specified structure. The present invention has thus been accomplished based on such a finding.

SUMMARY OF THE INVENTION

According to the present invention, there is provided a thermoplastic resin composition substantially constituted of (A) 25 to 70% by weight of a polyamide, (B) 25 to 70% by weight of a polyphenylene ether and (C) 2 to 25% by weight of a block copolymer having at least one polymer block mainly comprised of a vinyl aromatic compound and at least one polymer block mainly comprised of a conjugated diene compound having the content of the vinyl aromatic compound in the range of 25 to 85% by weight; wherein said polyamide forms a continuous phase, and, in said continuous phase, said polyphenylene ether is dispersed to form a dispersed phase having its average particle diameter ranging from 0.5 to 10 μm, and further, substantially all of said block copolymer is micro-dispersed in the dispersed phase of the polyphenylene ether.

The resin composition of the present invention has excellent thermal resistance, stiffness, molding flow properties and oil resistance, since it has the structure such that the block copolymer has been micro-dispersed in the polyphenylene ether dispersed phase, without separately and individually being dispersed in the continuous phase of the polyamide. It is further considered that the impact resistance can be enhanced without impairing the above properties, since the resin composition has the structure such that the polyphenylene ether phase in which the block copolymer is microdispersed is finely dispersed in the polyamide phase.

The polyphenylene ether component of the composition of the present invention comprises a repeating unit or units of formula (I) and/or formula (II) shown below:

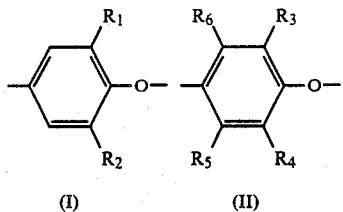

wherein $R_1$, $R_2$, $R_3$, $R_4$ and $R_5$ and $R_6$ may be the same or different and each represents a monovalent radical such as an alkyl group having 1 to 4 carbon atoms excluding tert-butyl group, an aryl group, a halogen atom and a hydrogen atom; provided that $R_1$ and $R_2$; as well as $R_3$ and $R_4$, are each not hydrogen at the same time, including a homopolymer comprising the constituent unit of Formula (I) or a copolymer comprising the constituent units of Formulae (I) and (II), and a graft copolymer obtained by graft polymerizing said copolymer with styrene or the like.

Typical examples of polyphenylene ether homopolymers may include homopolymers such as poly(2,6-dimethyl-1,4-phenylene) ether, poly(2-methyl-6-ethyl-1,4-phenylene) ether poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloro-1,4-phenylene) ether, poly(2-methyl-6-hydroxyethyl-1,4-phenylene) ether and poly(2-methyl-6-chloroethyl-1,4-phenylene) ether.

The polyphenylene ether copolymer may include polyphenylene ether copolymers mainly comprised of a polyphenylene ether structure obtained by copolymerization with alkyl substituted phenols such as o-cresol and a 2,3,6-trimethylphenol represented by the formula:

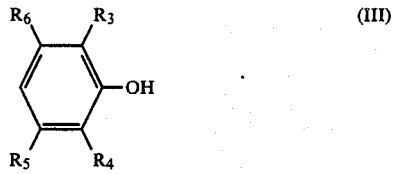

wherein $R_3$, $R_4$, $R_5$ and $R_6$ each represents a monovalent radical such as an alkyl group having 1 to 4 carbon atoms excluding tert-butyl group, an aryl group, a halogen atom and a hydrogen atom; provided that $R_3$ and $R_4$ are each are not a hydrogen at the same time.

The polyamide used in the composition of the present invention may be any one of those having a

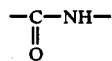

group in the main chain of the polymer and is capable of being melted when heated.

Typical examples thereof may include nylon 4, nylon 6, nylon 6,6, nylon 12, nylon 6,10, a polyamide from terephthalic acid and trimethylhexamethylenediamine, a polyamide from adipic acid and methaxylilenediamine, a polyamide from adipic acid, azelaic acid and 2,2-bis(p-aminocyclohexyl)-propane, a polyamide from terephthalic acid and 4,4'-diaminodicyclohexylmethane, a polyamide comprising combination of two or more of these, etc.

Of these, particularly preferred is nylon 6, nylon 6,6, nylon 6,10 or a nylon 6-, 6,6-copolymer.

In the block copolymer used in the composition of the present invention, it is required that substantially all of the copolymer is micro-dispersed in the polyphenylene ether phase present as a dispersed phase, and in order for such a requirement to be accomplished, the copolymer is required to be a rubber-like substance having an affinity which is stronger for polyphenylene ether than for polyamide. The block copolymer which is usable in the composition of the present invention is limited to a block copolymer having at least one polymer block mainly comprised of a vinyl aromatic compound and at least one polymer block mainly comprised of a conjugated diene compound having the content of the vinyl aromatic compound in the range of 25 to 85% by weight. The content of the vinyl aromatic compound is preferably in the range of 30 to 70% by weight, more preferably of 35 to 60% by weight. When the content of the vinyl aromatic compound is less than 25 by weight %, the rubber-like substance cannot be present in the polyphenylene ether phase, which is present as a dispersed phase, in a substantial amount. The content of more than 85% by weight may result in drastic decrease in the reinforcing effect of the rubber-like substance and would result in the composition not having sufficient impact resistance.

When the content of the vinyl aromatic compound ranges from 25 to 30% by weight, the block copolymer can be present as dispersed particles in the polyphenylene ether phase, but the diameter of the dispersed particles tend to be enlarged and thus cause the impact resistance to be lowered. When the content of the vinyl aromatic compound ranges from 30 to 35% by weight, the block copolymer can be present in the polyphenylene ether phase and also the diameter of dispersed particles of polyphenylene ether can be small, whereby the impact resistance is enhanced. When the content of the vinyl aromatic compound ranges from 35 to 60% by weight, the block copolymer can be very homogeneously dispersed in the polyphenylene ether phase and, at the same time, the dispersed particles of polyphenylene ether can also be homogeneously dispersed in the polyamide phase, whereby a composition having the most preferred balance in the respective properties can be obtained. When the content of the vinyl aromatic compound ranges from 70 to 85% by weight, the dispersed phase can be finely dispersed, but occasionally, such would result in the reinforcing effect by the rubber-like substance or the heat distortion resistance to be slightly lowered.

The above vinyl aromatic compound constituting the block copolymer is selected from one or more of, for example, styrene, α-methylstyrene, vinyltoluene, etc., and in which styrene is particularly preferred. The conjugated diene compound is selected from one or more of, for example, butadiene, isoprene, 1,3-pentadiene, etc., and in which butadiene is particularly preferred.

The molecular structure of the rubber-like substance may be a straight chain, branched or radial, or any of these may be freely combined. When an average value of the structures vinyl aromatic compound content is in the above range, two or more of block copolymers having different contents of the vinyl aromatic compound may be used (provided, however, that the vinyl content in the respective block copolymer be in the required range of 20 to 90% by weight). The block copolymer may also be modified by an organic compound or an inorganic compound as long as the properties thereof are not impaired.

The blending proportion of polyamide, polyphenylene ether and rubber-like substance in the composition of the present invention may be 25 to 70% by weight, preferably 30 to 60% by weight, of polyamide; 25 to 70% by weight, preferably 30 to 60% by weight, of polyphenylene ether; and 2 to 25% by weight, preferably 5 to 20% by weight, of the block copolymer, based on the total amount of these three components.

As for the dispersion form of the respective components, it is required that the polyamide forms a continuous phase, and, within this continuous phase, the polyphenylene ether is dispersed having its average particle diameter ranging from 0.5 to 10 $\mu$m, preferably from 0.8 to 7 $\mu$m, to form a dispersed phase, and further, substantially all of the block copolymer is micro-dispersed in the dispersed phase of the polyphenylene ether.

When the content of polyamide is less than 25% by weight or that of the polyphenylene ether is more than 70% by weight based on the total amount of the above three components, it is impossible for the polyamide to form a continuous phase and for the polyphenylene ether to form a dispersed phase, under any blending conditions. On the other hand, when the content of polyamide is more than 70% by weight or that of polyphenylene ether is less than 25% by weight, the heat distortion resistance of the composition under high load may become undesirably poor. The block copolymer is necessary for enhancing the impact resistance, and the content thereof of less than 2% by weight may result in no improvement effect in the impact resistance and, on the other hand, the content of more than 25% by weight may result in a decrease in the mechanical strength.

The dispersion form of the respective components has been defined above for the following reasons: When the dispersed phase is formed by polyamide or the continuous phase is formed by both the polyamide and polyphenylene ether, the oil resistance, heat resistance and stiffness properties may be lowered. When the average particle size of the dispersed phase of polyphenylene ether is less than 0.5 $\mu$m, the impact resistance and the molding flow properties may be lowered and, when the size is more than 10 $\mu$m, it then becomes difficult to form the dispersed phase in a stable state even under severe molding conditions. Further, when the block copolymer is independently present in the polyamide layer in a large amount, the heat distortion temperature and the stiffness properties may be lowered.

A general process for producing the composition of the present invention will be described below, but any other production process may be employed if the above respective conditions are satisfied.

The composition of the present invention can be obtained by melt kneading the polyamide, the polyphenylene ether and the block copolymer components, said components used in the proportion of 25 to 70% by weight, 25 to 70% by weight and 2 to 25% by weight, respectively, based on the total amount of the components. In the above case, it is preferable to use as a regulator to regulate the dispersed particle diameter of the polyphenylene ether, a maleic acid compound, a copolymer of a styrene compound with an $\alpha,\beta$-unsaturated dicarboxylic derivative, or a silane compound. The maleic acid compound may include, for example, maleic acid, maleic anhydride, a half alkyl ester of maleic acid, an amide of maleic acid, an imide of maleic acid, etc. Of these, preferred species are maleic acid and maleic anhydride. The copolymer of a styrene compound with an $\alpha,\beta$-unsaturated dicarboxylic derivative may include a copolymer of styrene with maleic anhydride, a copolymer of styrene with a half alkyl ester of maleic acid, a copolymer of styrene with an imide of maleic acid, etc. Of these, a preferred species is a copolymer of styrene with maleic anhydride. The silane compound refers to a compound simultaneously having (a) carbon-silicon bond, (b) a halogen atom or an alkoxy group and (c) an alkyl group, a vinyl group, an amino group, an epoxy group or a mercapto group. Of these, preferred species are vinyl methoxysilane and $\gamma$-aminopropylmethoxysilane.

The maleic acid compound, the copolymer of a styrene compound with an $\alpha,\beta$-unsaturated dicarboxylic derivative, or the silane compound may be present in the selected range of 0.05 to 10% by weight, preferably of 0.1 to 5% by weight, based on the total amount of the above-mentioned three components. The amount less than 0.05% by weight of the maleic acid compound, the copolymer of styrene compound with $\alpha,\beta$-unsaturated dicarboxylic derivative, or the silane compound added, may result in the average particle diameter of the dispersed being more than 10 $\mu$m with respect to the addition of more than 10% by weight, such is unnecessary, from an economical view-point.

As a dispersion form-controlling agent for readily and homogeneously dispersing the rubber-like substance in the dispersed phase of polyphenylene ether, there may be used a particular amine compound in combination with the maleic acid compound, the copolymer of a styrene compound with an $\alpha,\beta$-unsaturated dicarboxylic derivative, or the silane compound. Such an amine compound is a compound having in the molecule thereof, at least one nitrogen atom and sulfur atom such a compound may include, for example, phenothiazine, and phenothiazine derivatives having a substituent such as an alkyl group or an alkenyl group having 1 to 30 carbon atoms, an aryl group, an amide group and an acyl group. When these amine compounds are added, the amount therefor may be selected from the range of 0.05 to 2% by weight, preferably of 0.1 to 1% by weight, based on the total amount of the above-mentioned three components. The amount less than 0.05% by weight may result in substantially no effect being evident. Even if it is more than 2% by weight, it may not necessarily follow that the effect is further improved.

The temperature and time for the melt kneading may vary depending on the kind of polyamide to be used or the compositional proportion between the polyamide and the polyphenylene ether, but but the temperature usually used, ranges from from 240° C. to 350° C., preferably from 260° C. to 320° C., and the kneading time usually used is from about 0.2 minute to 10 minutes, preferably about 0.5 minute to 5 minutes. Usable melt kneading machines may include an extruder, a kneader, a roll, etc. Particularly preferable is an extruder.

To the composition of the present invention, other polymers, plasticizers, flame retarding agents or fillers such as glass fiber, carbon fiber, carbon black, silica and clay, and so forth may be optionally added as long as the purpose of the present invention is not damaged.

These other polymers are preferably polymers which are substantially compatible with the polyphenylene ether phase, and such may include, for example, polystyrenes, rubber modified polystyrenes, etc.

The dispersion form and the diameter of dispersed particles can be determined by an electron microscope photography. The diameter of dispersed particles can be calculated in the manner shown below:

That is, a transmission type electron microscope photograph (photograph magnification: 4,000) of an ultra-thin strip cut out of a molded product is taken, from which a dispersed particle diameter $d_i$ and a particle number $n_i$ is determined to calculate the average particle diameter of the dispersed phase according to the following formula:

$$\text{Average diameter} = \frac{\Sigma d_i^4 \cdot n_i}{\Sigma d_i^3 \cdot n_i}$$

Here, when the shape of particles can not be regarded as being round, the minor axis and the major axis thereof are measured with regard to half of the sum of both, as the particle diameter. In calculating the average particle diameter, diameters for at least 2,000 particles are measured.

The thermoplastic resin composition of the present invention, which is mainly constituted of the components comprising the polyamide, the polyphenylene ether and the block copolymer, shows properties which are well balanced in heat distortion resistance, impact resistance, oil resistance, stiffness, molding flow properties, etc. as compared with conventional products, since the three components have specified dispersion forms.

EXAMPLES

The present invention will be described in greater detail by the following Examples.

Commercially available products were used as the block copolymer when commercially available. Names of manufacturers thereof are noted at the foot of the respective table. When not commercially available, these copolymers were copolymerized following the process shown below, and used.

Copolymerization of the block copolymer:

Using a butyllithium catalyst and in cyclohexane, 12.5 parts by weight of styrene were polymerized and thereafter 75 parts by weight of butadiene were polymerized, followed by further polymerization by adding 12.5 parts by weight of styrene to obtain a 20 wt.% solution of a block polymer having a styrene content of 25% by weight. This block copolymer had a melt index of 6.0 (under Condition G). Block copolymers having different styrene content were also synthesized to give products having substantially the same melt index as above.

EXAMPLES 1 TO 3 AND COMPARATIVE EXAMPLES 1 TO 3

50 parts by weight of poly(2,6-dimethyl-1,4-phenylene)ether having an intrinsic viscosity of 0.62 (25° C., in chloroform), 40 parts by weight of nylon 6,6 (produced by Asahi Chemical Industry Co., Ltd.; trade name: LEONA 1300S), 10 parts by weight of a block copolymer (having the structure and the styrene content as shown in Table 1 were used), and 0.5 part by weight of maleic anhydride were fed into a twin screw extruder of 30 mm diameter, and extrusion kneaded at 300° C. and at a shear rate of 5 cm/sec to form pellets. Subsequently, test pieces were prepared using an injection molding machine to evaluate the properties according to the following test methods. Results obtained are shown in Table 1.

Heat distortion temperature: JIS K-7207; load: 18.6 kg/cm$^2$

Izod impact strength, notched: JIS K-7110, ¼" thick

Flexural modulus: ASTM-D 790

Flow: Short shot molding pressure at the molding of dumbbell test pieces at 290° C.

Oil resistance: State of appearance of molded products after exposure to steam of 1,1,1-trichloroethane for 5 minutes As shown in Table 1, Examples 1 to 3 show excellent heat distortion resistance, impact resistance, stiffness and oil resistance.

Contrary thereto, in Comparative Examples 1 and 2 wherein the block copolymer had no polystyrene block portion, most of the rubber-like substance does not disperse in polyphenylene ether, but disperse in the polyamide phase to lower the heat distortion resistance, the stiffness and the flow properties. Also, in Comparative Example 3 wherein Example 1 was repeated except that the extrusion was carried out at a shear rate of 2 cm/sec., the average particle diameter of PPE (polyphenylene ether) results in 10 μm or more to extremely lower the impact resistance or strength.

EXAMPLES 4 TO 7 AND COMPARATIVE EXAMPLE 4, 5

Example 1 was repeated except for varying the bound styrene content in block SBR (styrene-butadiene rubber). Results obtained are shown in Table 2. Examples 4 to 7 which are within the scope of the present invention are seen to be excellently balanced in the heat distortion, the impact resistance, the stiffness and the flow properties. On the other hand, in Comparative Example 4 which is outside the present invention, using a block copolymer having 20% by weight of bound styrene content, the block copolymer does not disperse in polyphenylene ether to become poor in the impact resistance, the heat distortion resistance, the stiffness and the flow properties. Also, in Comparative Example 5 wherein the copolymer has styrene block portion but the bound styrene conent is 90% by weight, the impact resistance is poor.

EXAMPLES 8 TO 12 AND COMPARATIVE EXAMPLES 6,7

These Examples were carried out by varying the formulation of the polyphenylene ether, the polyamide and the block copolymer. Results obtained are shown in Table 3. Any of Examples 8 to 12 which are within the scope of the formulation according to the present invention are seen to be very excellently balanced in the heat distortion resistance, the impact resistance, the stiffness, the flow properties and the oil resistance. Contrary thereto, in Comparative Example 6, the polyphenylene ether also forms a continuous layer to extremely worsen the oil resistance, the heat distortion resistance, the impact resistance and the flow properties. In Comparative Example 7, the content of polyphenylene ether is small to lower the heat distortion resistance and the stiffness.

EXAMPLE 13

Example 1 was repeated by replacing nylon 6,6 with nylon 6 (trade name: AMILAN 1017; produced by Toray Industries, Inc.). Results obtained are shown in Table 4.

EXAMPLE 14

Example 1 was repeated by replacing maleic anhydride as the dispersed particle diameter regulator with vinyl methoxysilane. Results obtained are shown in Table 4.

EXAMPLE 15

Example 2 was repeated except for addition of 0.2% by weight of phenothiazin as the dispersion form-controlling agent used in Example 2. Results obtained are shown in Table 5. Addition of phenothiazin has made small the dispersion diameter of PPE, and also made homogeneous the dispersion of the rubber-like substance in the PPE phase. The heat distortion resistance and the impact resistance have also enhanced.

EXAMPLE 16

This Example was carried out by using in combination, two kinds of block copolymers having different styrene content. Namely, Example 1 was repeated except for using in combination 7 parts by weight of a block copolymer having a styrene content of 20% by weight and 3 parts by weight of a block copolymer having a styrene content of 70% by weight (Average content: 35% by weight). Results obtained are shown in Table 6. It is seen that excellent properties are attained when the average content is in the specified range.

TABLE 1

| | | Unit | Example 1 | Example 2 | Example 3 | Comp. Ex. 1 | Comp. Ex. 2 | Comp. Ex. 3 |
|---|---|---|---|---|---|---|---|---|
| Block copolymer | Structure | — | Block SBR(*1) | Block SBR | Radial tereblock SBR(*2) | Random SBR(*3) | Polybuta-diene | Block SBR(*4) |
| | Bound styrene content | wt. % | 40 | 25 | 40 | 25 | 0 | 30 |
| Dispersion form | Continuous phase | — | Polyamide | Polyamide | Polyamide | Polyamide | Polyamide | Polyamide |
| | Dispersed phase | — | PPE + block copolymer | PPE + block copolymer | PPE + block copolymer | PPE + block copolymer | PPE + block copolymer | PPE + block copolymer |
| | Dispersion form of block copolymer | — | Dispersed in PPE phase | Dispersed in PPE phase | Dispersed in PPE phase | Mostly independently dispersed | Mostly independently dispersed | Dispersed in PPE phase |
| | Average particle diameter of PPE | μm | 2.0 | 8.2 | 4.5 | — | — | 14.3 |
| Properties | Heat distortion | °C. | 140 | 135 | 140 | 115 | 95 | 135 |
| | Izod impact strength | kgcm/cm | 35 | 15 | 30 | 10 | 7 | 8 |
| | Flexural modulus | kg/cm$^2$ | 23000 | 20000 | 22000 | 16000 | 14000 | 21000 |
| | Flow (Short shot molding pressure) | kg/cm$^2$ | 50 | 37 | 48 | 60 | 60 | 42 |
| | Oil resistance | — | good | good | good | rather good | rather good | good |

Foot Note:
(*1)Tufprene A (Produced by Asahi Kasei Kogyo Co., Ltd.)
(*2)Solprene T-414 (Produced by Japan Elastomer Inc.)
(*3)Solprene 1204 (Produced by Japan Elastomer Inc.)
(*4)Tufprene 200 (Produced by Asahi Kasei Kogyo Co., Ltd.)

TABLE 2

| | | Unit | Comp. Ex. 4 | Example 4 | Example 5 | Example 6 | Example 7 | Comp. Ex. 5 |
|---|---|---|---|---|---|---|---|---|
| Block copolymer | Structure | — | Block SBR | Block SBR(*1) | Block SBR | Block SBR(*2) | Block SBR(*3) | Block SBR |
| | Bound styrene content | wt. % | 20 | 30 | 35 | 70 | 80 | 90 |
| Dispersion form | Continuous phase | — | Polyamide | Polyamide | Polyamide | Polyamide | Polyamide | Polyamide |
| | Dispersed phase | — | PPE + block copolymer | PPE + block copolymer | PPE + block copolymer | PPE + block copolymer | PPE + block copolymer | PPE + block copolymer |
| | Dispersion form of block copolymer | — | Mostly independently dispersed | Dispersed in PPE phase | Dispersed in PPE phase | Dispersed in PPE phase | Dispersed in PPE phase | Dispersed in PPE phase |
| | Average particle diameter of PPE | μm | — | 5.9 | 2.1 | 1.5 | 1.3 | 1.4 |
| Properties | Heat distortion temperature | °C. | 100 | 140 | 140 | 130 | 145 | 140 |
| | Izod impact strength | kgcm/cm | 2.5 | 25 | 33 | 20 | 15 | 8 |
| | Flexural modulus | kg/cm$^2$ | 15000 | 22000 | 23000 | 22000 | 21000 | 20000 |
| | Flow (Short shot molding pressure) | kg/cm$^2$ | 50 | 40 | 45 | 53 | 30 | 30 |
| | Oil resistance | — | good | good | good | good | good | good |

Foot Note:
(*1)Tufprene 200 (Produced by Asahi Kasei Kogyo Co., Ltd.)
(*2)Asaflex 810 (Produced by Asahi Kasei Kogyo Co., Ltd.)
(*3)Asaflex 800 (Produced by Asahi Kasei Kogyo Co., Ltd.)

TABLE 3

| | | Unit | Comp. Ex. 6 | Example 8 | Example 9 | Example 10 | Comp. Ex. 7 | Example 11 | Example 12 |
|---|---|---|---|---|---|---|---|---|---|
| Formulation | PPE | pbw | 75 | 65 | 40 | 30 | 20 | 50 | 45 |
| | 6,6-nylon | " | 15 | 25 | 50 | 60 | 70 | 45 | 35 |

TABLE 3-continued

|  |  | Unit | Comp. Ex. 6 | Example 8 | Example 9 | Example 10 | Comp. Ex. 7 | Example 11 | Example 12 |
|---|---|---|---|---|---|---|---|---|---|
|  | Block copolymer | " | 10 | 10 | 10 | 10 | 10 | 5 | 20 |
|  | Maleic anhydride | " | 0.5 | 0.5 | 0.5 | 0.5 | 0.5 | 0.5 | 0.5 |
| Dispersion form | Continuous phase | — | Polyamide + PPE | Polyamide | Polyamide | Polyamide | Polyamide | Polyamide | Polyamide |
|  | Dispersed phase | — | Polyamide + PPE | PPE + block copolymer | PPE + block copolymer | PPE + block copolymer | PPE + block copolymer | PPE + block copolymer | PPE + block copolymer |
|  | Dispersion form of block copolymer | — | Dispersed in PPE phase | Dispersed in PPE phase | Dispersed in PPE phase | Dispersed in PPE phase | Dispersed in PPE phase | Dispersed in PPE phase | Dispersed in PPE phase |
|  | Average particle diameter of PPE | μm | — | 9.0 | 3.7 | 3.5 | 3.6 | 3.0 | 6.0 |
| Properties | Heat distortion temperature | °C. | 95 | 140 | 125 | 115 | 90 | 150 | 125 |
|  | Izod impact strength | kgcm/cm | 2 | 20 | 30 | 30 | 25 | 20 | 35 |
|  | Flexural modulus | kg/cm² | 12000 | 22000 | 21000 | 20000 | 19000 | 25000 | 18000 |
|  | Flow (Short shot molding pressure) | kg/cm² | 70 | 50 | 35 | 33 | 30 | 37 | 45 |
|  | Oil resistance | — | poor | good | good | good | good | good | good |

TABLE 4

|  | Unit | Example 13 | Example 14 |
|---|---|---|---|
| Polyamides: | — | Nylon 6 | Nylon 6,6 |
| Dispersed particle diameter regulator of PPE: | — | Maleic anhydride | Vinyl methoxysilane |
| Dispersion form: |  |  |  |
| Continuous phase | — | Polyamide | Polyamide |
| Dispersed phase | — | PPE + block copolymer | PPE + block copolymer |
| Dispersion form of block copolymer | — | Dispersed in PPE phase | Dispersed in PPE phase |
| Average particle diameter of PPE | μm | 5.6 | 7.0 |
| Properties: |  |  |  |
| Heat distortion temperature | °C. | 130 | 140 |
| Izod impact strength | kg·cm/cm | 30 | 15 |
| Flexural modulus | kg/cm² | 20,000 | 22,000 |
| Flow (Short shot molding pressure) | kg/cm² | 37 | 40 |
| Oil resistance | — | Good | Good |

TABLE 5

|  | Unit | Example 15 |
|---|---|---|
| Dispersion form-controlling agent: [Phenothiazin] | Parts by weight | 0.2 |
| Dispersion form: |  |  |
| Continuous phase | — | Polyamide |
| Dispersed phase | — | PPE + block copolymer |
| Dispersion form of block copolymer | — | Homogeneously dispersed in PPE phase |
| Average particle diameter of PPE | μm | 3.5 |
| Properties: |  |  |
| Heat distortion temperature | °C. | 142 |
| Izod impact strength | kg·cm/cm | 30 |
| Flexural modulus | kg/cm² | 21,000 |
| Flow (Short shot molding pressure) | kg/cm² | 40 |
| Oil resistance | — | Good |

TABLE 6

|  | Unit | Example 16 |
|---|---|---|
| Dispersion form: |  |  |
| Continuous phase | — | Polyamide |
| Dispersed phase | — | PPE + block copolymer |
| Dispersion form of block copolymer | — | Dispersed in PPE phase |
| Average particle diameter of PPE | μm | 2.5 |
| Properties: |  |  |
| Heat distortion temperature | °C. | 140 |
| Izod impact strength | kg·cm/cm | 30 |
| Flexural modulus | kg/cm² | 23,000 |
| Flow (Short shot molding pressure) | kg/cm² | 48 |
| Oil resistance | — | Good |

We claim:

1. A thermoplastic resin composition substantially constituted of components (A) 25 to 70% by weight of a polyamide, (B) 25 to 70% by weight of a polyphenylene ether and (C) 2 to 25% by weight of a block copolymer having at least one polymer block mainly comprised of a vinyl aromatic compound and at least one polymer block mainly comprised of a conjugated diene compound having the content of the vinyl aromatic compound in the range of 25 to 85% by weight; wherein said polyamide forms a continuous phase, and, in said continuous phase, said polyphenylene ether is dispersed to form a dispersed phase having its average particle diameter ranging from 0.5 to 10 μm, and further, substantially all of said block copolymer is microdispersed in the dispersed phase of the polyphenylene ether.

2. The composition according to claim 1, wherein component (C) is a block copolymer having the content of the vinyl aromatic compound in the range of 30 to 70% by weight.

3. The composition according to claim 1, wherein component (C) is a block copolymer having the content of the vinyl aromatic compound in the range of 35 to 60% by weight.

4. The composition according to claim 1, wherein component (C) is a block copolymer comprising styrene and butadiene and having the styrene content in the range of 35 to 60% by weight.

5. The composition according to claim 1, wherein component (A) is a polyamide selected from the group consisting of nylon 6, nylon 6,6 a nylon 6-,6,6-copolymer and mixtures thereof.

6. The composition according to claim 1, wherein component (B) is a polyphenylene ether comprising a structure unit of formula (I) shown below:

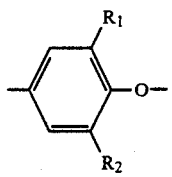

(I)

wherein $R_1$ and $R_2$ may be the same or different and each represents a monovalent radical selected from the group consisting of an alkyl group having 1 to 4 carbon atoms excluding tert-butyl group, an aryl group, a halogen atom and a hydrogen atom, and $R_1$ and $R_2$ are each not a hydrogen atom at the same time.

7. The composition according to claim 1, wherein component (B) is poly(2,6-dimethyl-1,4-phenylene) ether.

8. The composition according to claim 1, wherein component (B) is a copolymer comprising structure units of formulae (I) and (II) shown below:

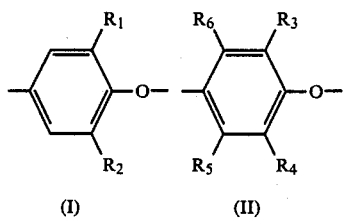

(I)          (II)

wherein $R_1$, $R_2$, $R_3$, $R_4$, $R_5$ and $R_6$ may be the same or different and each represents a monovalent radical selected from the group consisting of an alkyl group having 1 to 4 carbon atoms excluding tert-butyl group, an aryl group, a halogen atom and a hydrogen atom; provided that $R_1$ and $R_2$, as well as $R_3$ and $R_4$, are each not a hydrogen at the same time.

9. The composition according to claim 4, wherein component (A) is at least one selected from the group consisting of nylon 6, nylon 6,6 and a nylon 6-6,6-copolymer and component (B) is poly(2,6-dimethyl-1,4-phenylene) ether.

10. The composition according to any one of claims 1 to 9, wherein the dispersed phase formed by dispersing polyphenylene ether in the continuous phase has an average particle diameter of 0.8 to 7 μm.

11. The composition according to claim 1, wherein component (B) is a polyphenylene ether comprising a structure unit of formula (II) shown below:

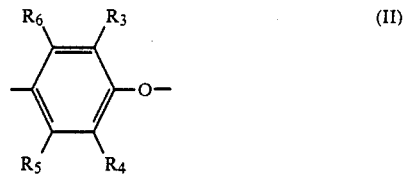

(II)

wherein $R_3$, $R_4$, $R_5$ and $R_6$ may be the same or different and each represents a monovalent radical selected from the group consisting of an alkyl having 1 to 4 carbon atoms excluding tert-butyl group, an aryl group, a halogen atom and a hydrogen atom; provided that $R_3$ and $R_4$ are each not hydrogen atom at the same time.

12. The composition according to claim 1, wherein component (B) is a polyphenylene ether homopolymer selected from the group consisting of poly(2,6-dimethyl-1,4-phenylene) ether, poly(2-methyl-6-ethyl-1,4-phenylene) ether, poly-(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloro-1,4-phenylene) ether, poly(2-methyl-6-hydroxyethyl-1,4-phenylene) ether, poly(2-methyl-6-chloroethyl-1,4-phenylene) ether and mixtures thereof.

13. The composition according to claim 1, wherein component (A) is a polyamide having a

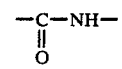

group in the main chain and is capable of being melted when heated.

14. The composition according to claim 1, wherein component (A) is a polyamide selected from the group consisting of nylon 4, nylon 6, nylon 6,6, nylon 12, nylon 6,10, a polyamide from terephthalic acid and trimethylhexamethylenediamine, a polyamide from adipic acid and methaxylilenediamine, a polyamide from adipic acid, azelaic acid and 2,2-bis(p-aminocyclohexyl)-propane, a polyamide from terephthalic acid, 4,4'-diaminodicyclohexylmethane and mixtures thereof.

15. The composition according to claim 1, wherein the vinyl aromatic compound of the block copolymer is selected from the group consisting of styrene, α-methylstyrene, vinyltoluene and mixtures thereof and the conjugated diene compound of the block copolymer is selected from the group consisting of butadiene, isoprene, 1,3-pentadiene and mixtures thereof.

16. The composition according to claim 15, wherein the vinyl aromatic compound is styrene and the conjugated diene compound is butadiene.

17. The composition according to claim 1, wherein said composition is substantially constituted of 30 to 60% by weight of component (A), 30 to 60% by weight of component (B) and 5 to 20% by weight of component (C).

* * * * *